(12) United States Patent
Wagner et al.

(10) Patent No.: US 11,449,752 B2
(45) Date of Patent: Sep. 20, 2022

(54) SYSTEM AND METHOD FOR GRADIENT ACCUMULATION WITH FREE MOMENTUM

(71) Applicant: Microsoft Technology Licensing, LLC, Redmond, WA (US)

(72) Inventors: Andrew Wagner, Cupertino, CA (US); Marc Tremblay, Bellevue, WA (US); Saurabh M. Kulkarni, Redmond, WA (US); Tiyasa Mitra, San Jose, CA (US); Sujeeth S. Bharadwaj, Milpitas, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 347 days.

(21) Appl. No.: 16/836,067

(22) Filed: Mar. 31, 2020

(65) Prior Publication Data
US 2021/0303991 A1 Sep. 30, 2021

(51) Int. Cl.
*G06N 3/02* (2006.01)
*G06N 3/08* (2006.01)
*G06N 3/04* (2006.01)

(52) U.S. Cl.
CPC ............. *G06N 3/08* (2013.01); *G06N 3/04* (2013.01)

(58) Field of Classification Search
CPC .......... G06N 3/08; G06N 3/04; G06N 3/0445; G06N 3/0454; G06N 3/084; G06N 3/063
See application file for complete search history.

(56) References Cited

U.S. PATENT DOCUMENTS

| | | | |
|---|---|---|---|
| 10,810,492 B2* | 10/2020 | Xu | G06N 3/0454 |
| 11,244,239 B2* | 2/2022 | Tatsumura | G01N 15/00 |
| 2016/0179790 A1* | 6/2016 | Watanabe | G06F 40/44 704/7 |
| 2016/0196488 A1* | 7/2016 | Ahn | G06N 3/049 706/41 |
| 2019/0095783 A1* | 3/2019 | Kim | G06N 3/0472 |
| 2021/0064985 A1* | 3/2021 | Sun | G06N 3/063 |
| 2021/0303991 A1* | 9/2021 | Wagner | G06N 3/084 |
| 2021/0374508 A1* | 12/2021 | Whatmough | G06N 3/0454 |
| 2021/0390415 A1* | 12/2021 | Chang | G06N 3/04 |
| 2022/0121976 A1* | 4/2022 | Tatsumura | G01N 15/00 |

* cited by examiner

*Primary Examiner* — Thien Nguyen
(74) *Attorney, Agent, or Firm* — Fiala & Weaver P.L.L.C.

(57) ABSTRACT

Methods for gradient accumulation with free momentum are performed by systems and devices during neural network model training. An accumulator that includes a processor circuit and a memory element generates free momentum between passes of a neural network model training process. The processor circuit receives a difference weight (gradient) and generates a first input by applying a weighting parameter thereto. The processor circuit obtains a prior weight from the memory element and generates a second input by applying another weighting parameter thereto. The processor circuit generates a filtered input with momentum by filtering the first and second input. The memory element generates a stored next pass weight by accumulating the filtered input with the prior weight. A computing resource then processes the next pass of the neural network model training using the stored next pass weight. The methods, systems, and devices are applicable to pipelined model parallelism training processes.

20 Claims, 7 Drawing Sheets

SYSTEM AND METHOD FOR GRADIENT ACCUMULATION WITH FREE MOMENTUM

BACKGROUND

A common techniques for updating weights in neural networks is batched stochastic gradient descent (SGD). Batched SGD includes running multiple data samples through a network before updating the weights. There exist different implementations for SGD that deal with larger batch sizes, but all of these implementations require additional memory. One such technique for dealing with larger batch sizes is on device gradient accumulation using a block average for the accumulation, or determining updated weights by adding the prior weighting to a summation of the gradients of the weights at times between the current update and the last update. This technique has advantages when the size of the batched activations is larger than the weights, e.g., in different neural networks such as those that use pipeline modeling, but this technique also requires extra memory for momentum. That is, extra memory elements, in addition to existing memory elements used in the processing and training of neural networks, are required for momentum in current solutions, and thus the momentum is not free.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for gradient accumulation with free momentum are performed by systems and devices during neural network model training. A computing system includes one or more accumulators and one or more computing resources. Accumulators are implemented in various points in layers and transformers throughout the computing system for performing neural network model training via gradient accumulation with free momentum. Accumulators generate free momentum between passes of neural network model training process and each include a processor circuit and a memory element that generate free momentum. The processor circuits receive difference weights or gradients determined by the computing system, and generate first inputs by applying weighting parameters to the difference weights. The processor circuits also obtain prior weights from their respective memory elements, and generate second inputs by applying other weighting parameters to the prior weights. These first inputs and second inputs are filtered by the processor circuits to generate filtered inputs with momentum that are accumulated by the memory elements with prior weights to generate stored next pass weights for the next pass of the training process. The computing resources then process the next pass of the neural network model training using the next pass weights. The methods, systems, and devices described are applicable to pipelined model parallelism training processes.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
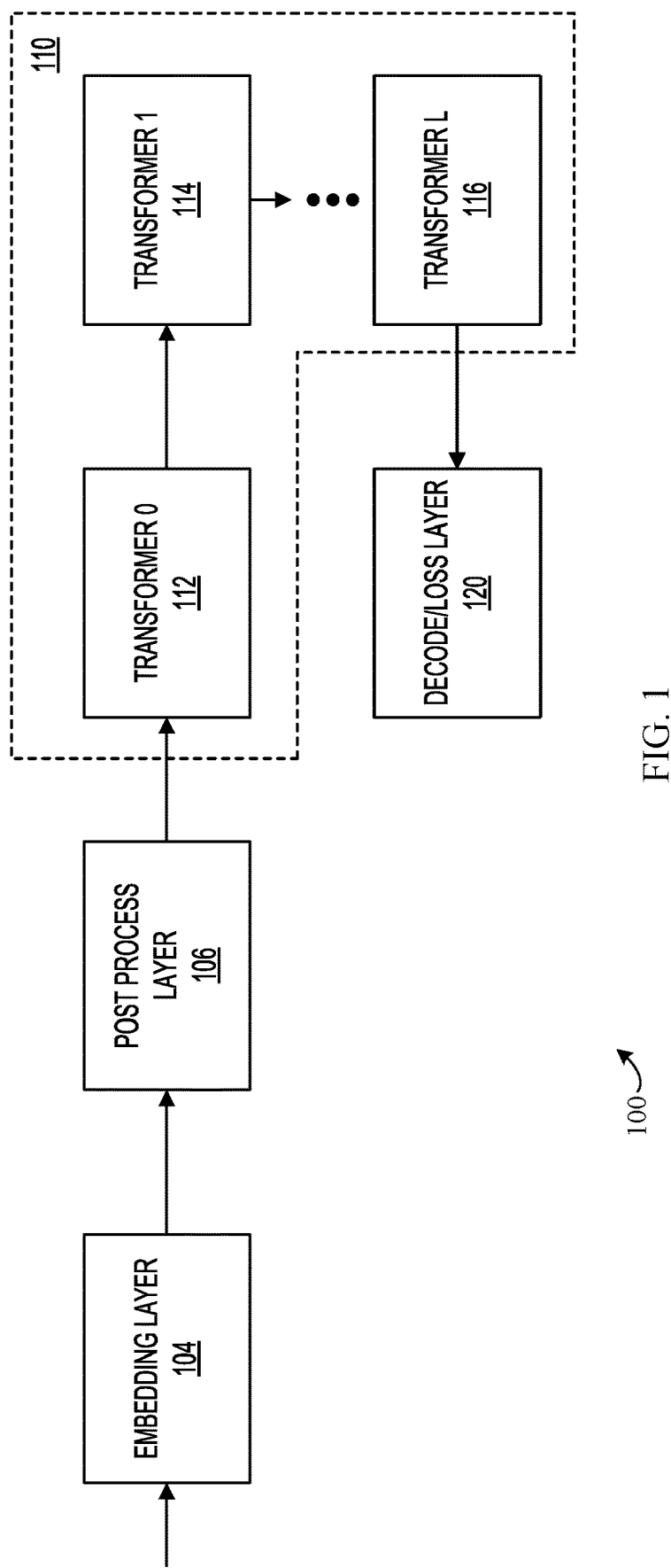
FIG. 1 shows a block diagram of a system for gradient accumulation with free momentum, in accordance with an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein are configurable to be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for gradient accumulation with free momentum during neural network model training. Section III below describes example computing device embodiments used to implement features of the embodiments described herein. Section IV below describes additional examples and advantages, and Section V provides some concluding remarks.

II. Example Embodiments for Gradient Accumulation with Free Momentum

Methods, systems, apparatuses, devices, circuits, and computer program products are provided herein for gradient accumulation with free momentum for neural network model training. Embodiments disclosed herein relate to neural network processing and training with continuous asynchronous updates. More specifically, the described embodiments provide for gradient accumulation with free momentum during such neural network training and processing. Embodiments describe example neural network processing/training in which the layers, sublayers, or even smaller portions of the neural network are partitioned to achieve parallelism and perform gradient accumulation with free momentum, including embodiments describing model parallelism.

As an example, in model parallelism, different computing resources in the system are responsible for the computations in different parts or portions of a single network. For instance, each layer, sublayer, or even a smaller portion of the neural network is assigned to a different processing device in a computing system. Thus, as part of model parallelism, the neural network model is split among different processing devices (e.g., central processing units (CPUs), graphics processing units (GPUs), intelligent/intelligence processing units (IPUs), tensor processing units (TPUs), field programmable gate arrays (FPGAs), application specific integrated circuits (ASICs), or other types of processing devices) but each processing device is configured to use the same data. Accordingly, model parallelism is achieved by splitting weights for model training among the processing devices.

Neural networks include many numeric operations which need to be efficiently partitioned across computation resources. There are many approaches to this partitioning, each of which is highly model- and architecture-specific. One approach is to split the neural network layers onto sequential computing resources to achieve pipeline parallelism. Pipeline parallelism is efficient for processing feed-forward networks but becomes much more complicated when feedback and weighting updates are applied. Some neural networks update weights based on a mini-batch, rather than using the full batch size. This approach, however, is inefficient for a pipelined model as it requires the contents to be flushed out of the pipeline before continuing. The flushing operation requires the pipeline to be cleared out at the end of the mini-batch and refilled at the start of the next mini-batch, leading to inefficiencies.

Embodiments herein include updating weights continually and asynchronously during training of a neural network model in a way that provides gradient accumulation with free momentum. Weight updates are applied during back-propagation in processing/training, in embodiments. As an example, the gradient of a loss function with respect to the weights in the network (or a portion of the network) is calculated. The gradient is then fed to an optimization method that uses the gradient to update the weights to minimize the loss function. The goal with back-propagation is to update each of the weights (or at least some of the weights) in the network so that they cause the actual output to be closer to the target output, thereby minimizing the error for each output neuron and the network as a whole.

As part of model parallelism, the neural network is partitioned into different neural computational units each of which are capable of being processed independently by a computing resource. Each computing resource is implemented as a separate device (e.g., a GPU, a TPU, an IPU, etc.) or the computing resources are enabled to share a device. Thus, in one example, each device (e.g., an IPU) includes two or more computing resources configured to process two or more different computational units (e.g., two or more different layers) associated with the neural network model.

Some embodiments herein including pipelined model parallelism are described with reference to an example of the Bidirectional Encoder Representations from Transformers (BERT) model for illustration, and by way of non-limiting example only, although other types of models/architectures are also contemplated. In some embodiments, the BERT model is illustrated and described for word completions for sentences and other natural language processing (NLP) related problems and/or training.

As noted above, the described embodiments also provide for gradient accumulation with free momentum for updating weights during training. The architectures described for accumulators herein provide a unique configuration for processing components, using a single, existing memory element, and enabling the insertion of a portion of a prior pass weight into the current weight update during training that allows for an acceleration of training convergence, e.g., increased gain, by (1) increasing updates associated with gradients that speed up convergence, and (2) decreasing updates associated with gradients that increase oscillation or diverge, i.e., momentum. Additionally, embodiments herein provide for momentum without requiring the use of additional memory elements for neural networks.

Embodiments herein are flexible and scalable for providing free momentum with other processes and methods, e.g., including but not limited to, Adaptive Moment Estimation (Adam) that use second-order power normalization. Accordingly, memory intensive neural network training is more efficient with respect to processing resources, i.e., momentum provides for faster convergence in model training, without increasing the memory footprint, or memory requirement, of the system. In other words, unlike traditional approaches such as batched stochastic gradient descent (SGD) which use a block average for accumulation and require a second, additional memory element to achieve momentum, the embodiments herein utilize a processing architecture that provides momentum with only a single memory element while approximating a moving average via a "leaky" accumulator.

These and other embodiments for gradient accumulation with free momentum will be described in further detail below in association with the Figures, and in the Sections/Subsections that follow.

Systems and devices are configured in various ways for gradient accumulation with free momentum. For instance FIG. 1 shows a block diagram of a system 100 for an example architecture of a BERT implementation to be trained using pipelined model parallelism via gradient accumulation with free momentum. The BERT implementation in the non-limiting, illustrative embodiment of system 100 is used to learn contextual relations between words in text, e.g., for NLP.

System 100 comprises input stages, including an embedding layer 104 and a post process layer 106. System 100 further includes a plurality of transformers 110, including transformer 0 112, transformer 1 114, and transformer L 116. System 100 further includes a decode/loss layer 120. It should be noted that, in various embodiments, different numbers of layers, transformers, and/or the like, are present. Additionally, according to embodiments, any combination of the systems and/or components illustrated in FIG. 1 are present in system 100.

Embedding layer 104 is configured to convert each input token (e.g., a word in a sequence) into a vector representation. Vector size is configurable as a 768-dimension vector, a 1024-dimension vector, or the like. Post process layer 106 is configured to perform additional operations, including but without limitation, position embedding, sentence embedding, token masking, and/or the like. Position embedding is used to show token positions within a sequence, sentence embedding is used to map sentences to vectors, and token masking includes replacing a certain percentage of the words in each sequence with a mask token. Decode/loss layer 120 is configured to produce predictions based on the training process. Transformers 110 are configured to convert input sequences into output sequences using self-attention, and are described in further detail below.

The example architecture of the BERT implementation in system 100 of FIG. 1 is configured to perform gradient accumulation with free momentum, as described herein. That is, according to embodiments, one or more operations/functions of the layers and/or the transformers of system 100 are performed using accumulators having a unique configuration for their processing components that uses a single memory element and enables the insertion of a portion of a prior pass weight into the current weight update during training that allows for an acceleration of training convergence (i.e., via momentum), as described herein.

Figure 2:
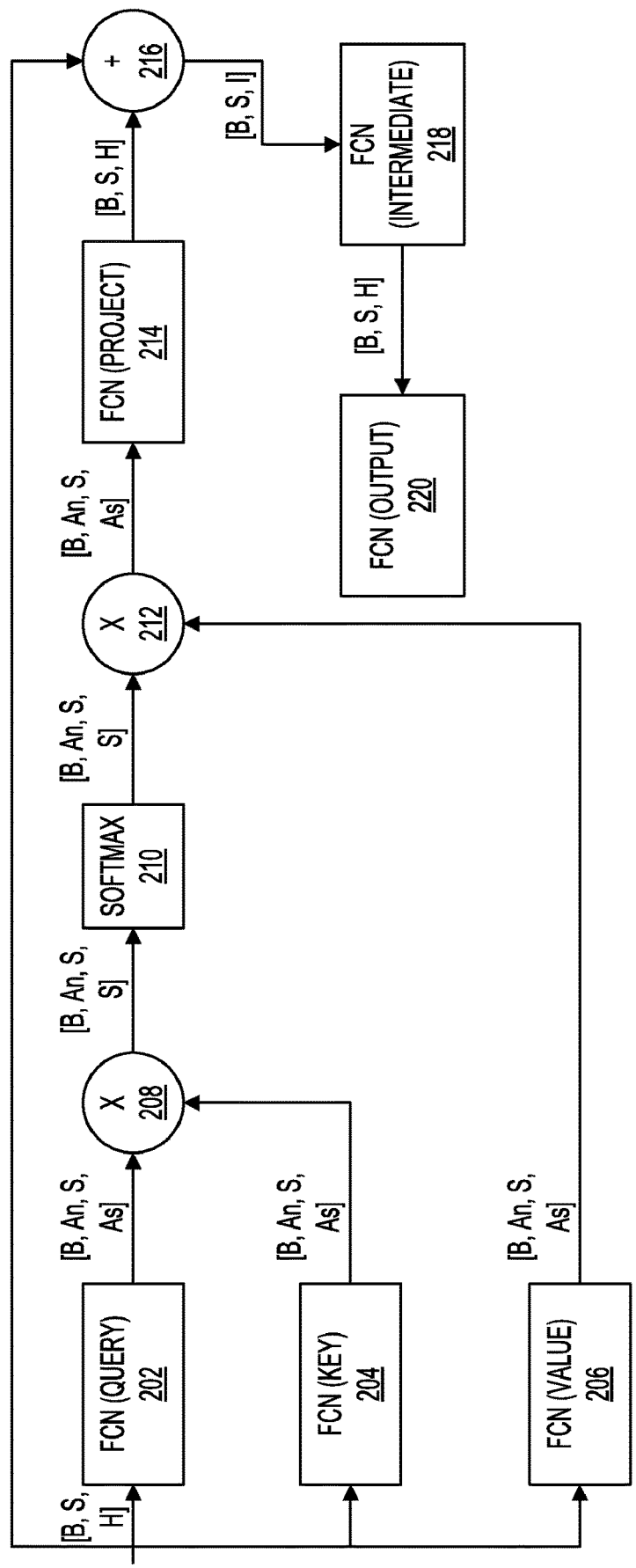
FIG. 2 shows a block diagram of a transformer for gradient accumulation with free momentum, in accordance with an example embodiment.

FIG. 2 shows a block diagram of a transformer 200 configured for gradient accumulation with free momentum, according to embodiments. Transformer 200 is an embodiment of any of transformers 110 of system 100 in FIG. 1, e.g., transformer 0 112, transformer 1 114, and/or transformer L 116 of FIG. 1. Transformer 200 is configured to convert input sequences into output sequences using self-attention. As a non-limiting, illustrative example, transformer 200 is described as follows.

In the illustrated embodiment, transformer 200 is configured to process a batch of layers with a batch size of B. A sequence (S) length is the number of words in each sequence being processed during training. Transformer 200 is configured to have hidden layers (H), that may number 12 or 24 or the like. Vector size (also included herein as H, hidden size) specifies whether each word is converted into a vector of the specified dimension, e.g., a 768-dimension vector or a 1024-dimension vector or the like. Intermediate size (I) shown in transformer 200 is a 3072-dimension vector or a 4096-dimension vector or the like.

In FIG. 2, transformer 200 includes fully-connected network (FCN) layers, including FCN (Query) 202, FCN (Key) 204, and FCN (Value) 206. Self-attention maps a query and a set of key-value pairs to an output via a multiplier 208. The attention function shown is implemented using SoftMax block 210 and receives the result of multiplier 208. Transformer 200 further includes additional fully-connected network (FCN) layers, including FCN (Project) 214, FCN (Intermediate) 218, and FCN (Output) 220.

FCN (Project) 214 is a project layer that receives the output of a multiplication of the FCN (Value) 206 output and the SoftMax block 210 output, and the output of FCN (Project) 214 is provided to an adder 216 along with the [B, S, H] input to transformer 210. The output of adder 216 is provided to FCN (Intermediate) 218 which relates to the intermediate representations of the same tokens as represented in the output (FCN (Output) 220). In terms of the complexity of operations associated with the transformers represented by transformer 200, fully connected layers are the dominant factors.

Figure 3:
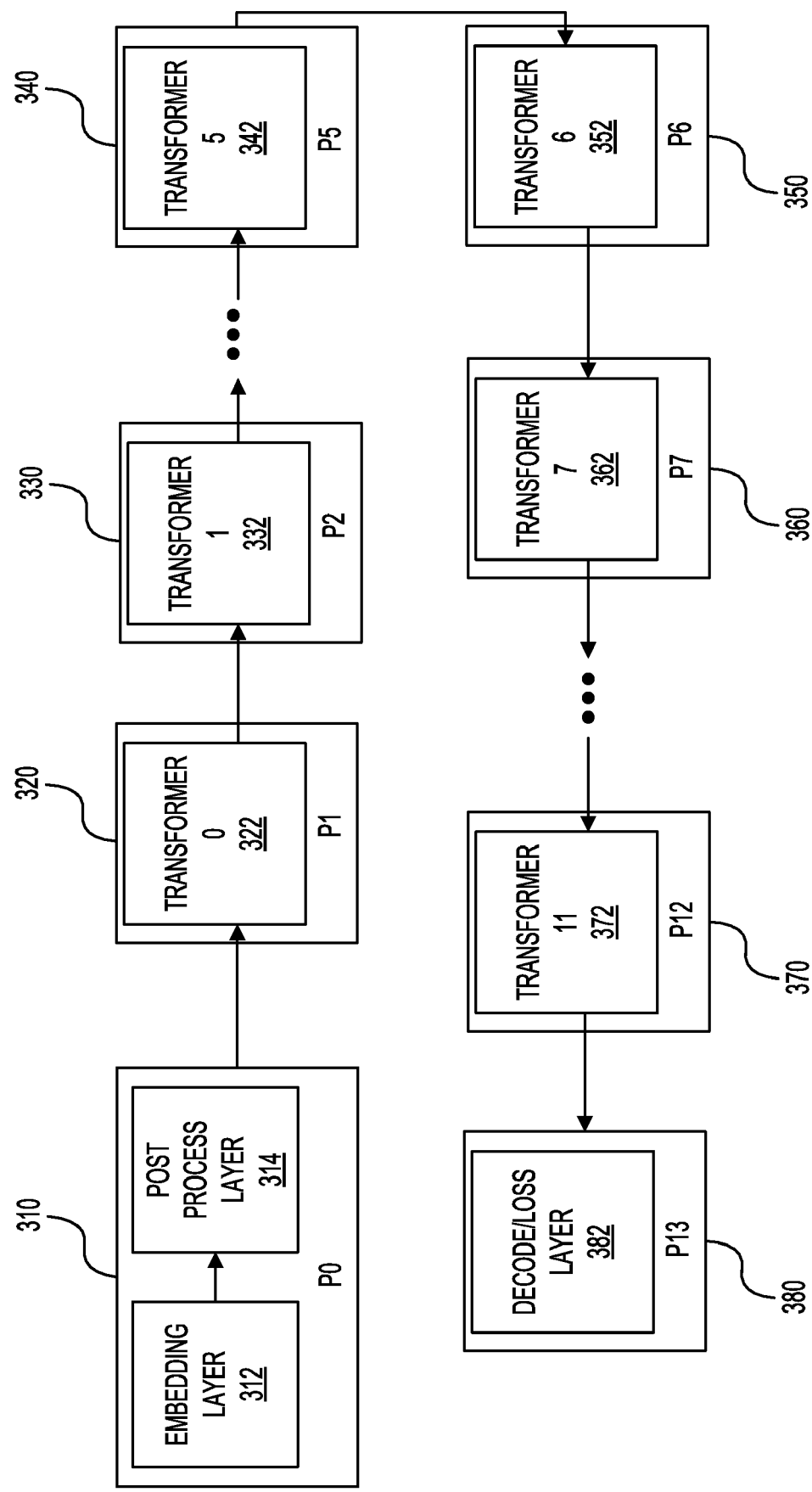
FIG. 3 shows a block diagram of a system for gradient accumulation with free momentum, in accordance with an example embodiment.

FIG. 3 shows a system 300 with partitioning of transformers to computing resources configured for gradient accumulation with free momentum, according to embodiments. In system 300, the computing resources illustrated are any combination of processing cores and memory. In embodiments, the pipeline illustrated by system 300 is structured such that each computing resource in the pipeline (e.g., a processor or a combination of a processor and memory) handles approximately the same amount of operations to facilitate effective pipeline utilization. System 300 is an embodiment of system 100 of FIG. 1 and transformer 200 of FIG. 2.

In system 300, an embedding layer 312 and a post process layer 314 of the illustrated BERT model is configured for processing by a computing resource P0 310, a transformer 0 322 is configured for processing by a computing resource P1 320, a transformer 1 332 is configured for processing by a computing resource P2 330, a transformer 5 342 is configured for processing by a computing resource P5 340, a transformer 6 352 is configured for processing by a computing resource P6 350, a transformer 7 362 is configured for processing by a computing resource P7 360, and a transformer 11 372 is configured for processing by a computing resource P12 370. It should be understood that the illustrated example is non-limiting, and that different numbers of layers and/or transformers are contemplated in embodiments.

A decode/loss layer 382 of the BERT model is configured for processing by computing resource P13 380. Although FIG. 3 shows each transformer partitioned to a separate computing resource, in some embodiments, various transformers share a respective computing resource. Thus, as an example, two transformers may be partitioned per computing resource. In some configurations contemplated herein, each computing resource are implemented using any number of GPUs, CPUs, memory (e.g., SRAM or other types of memory), FPGAs, and/or the like, including but without limitation, ASICs, Erasable and/or Complex programmable logic devices (PLDs), Programmable Array Logic (PAL) devices, and Generic Array Logic (GAL) devices, etc. In addition, although FIG. 3 illustrates the partitioning of the BERT model, embodiments herein are configured to partition and process different types of serializable neural network model, e.g., those that use gradient descent with a backward pass.

According to embodiments, one or more of the layers and/or transformers shown in system 300 of FIG. 3 are configured to perform gradient accumulation with free momentum, as described herein. For example, one or more of these layers and/or transformers include an accumulator having a unique configuration for their processing components that uses a single memory element and enables the insertion of a portion of a prior pass weight into the current weight update during training that allows for an acceleration of training convergence (i.e., momentum), as described herein.

Figure 4:
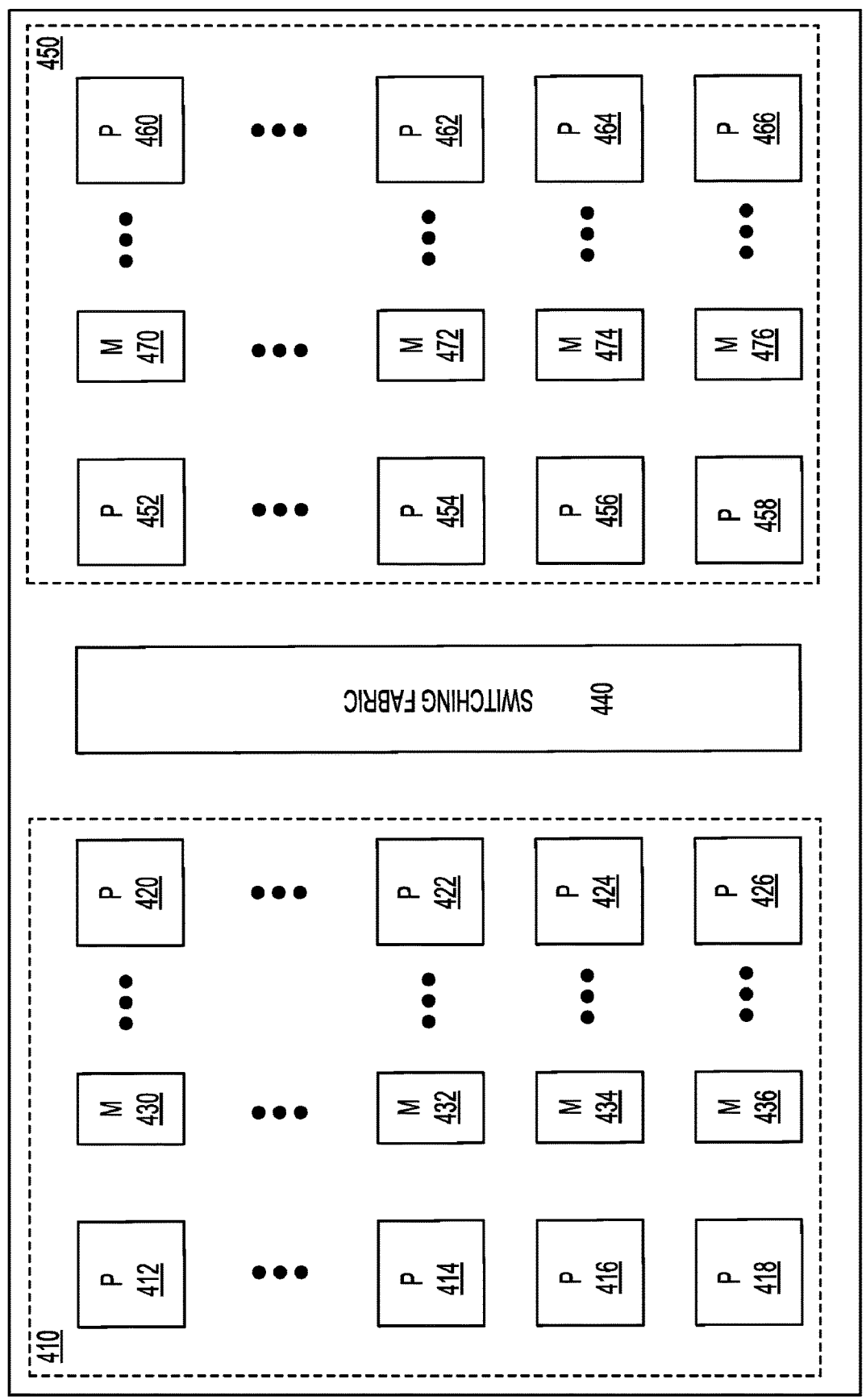
FIG. 4 shows a block diagram of a computing resource for gradient accumulation with free momentum, in accordance with an example embodiment.

FIG. 4 shows an implementation of a computing resource 400 configured to process or train a neural network model using gradient accumulation with free momentum, in accordance with embodiments. As shown, computing resource 400 corresponds to one or more of the computing resources described as part of system 300 of FIG. 3. In the illustrated embodiment, computing resource 400 includes two sets of processing cores and memory (a first set 410 and a second set 450) coupled via a switching fabric 440.

First set 410 includes a plurality of processing cores (P): P 412, P 414, P 416, P 418, P 420, P 422, P 424, and P 426. The processing cores (P) of first set 410 are arranged in columns and access local memory (e.g., SRAM or BRAM), in embodiments. First set 410 includes local memory M 430, M 432, M 434, and M 436. Second set 450 also includes a plurality of processing cores (P): P 452, P 454, P 456, P 458, P 460, P 462, P 464, and P 466. The processing cores (P) of first set 410 are arranged in columns and access local memory (e.g., SRAM or BRAM), in embodiments. Second set 450 includes local memory M 470, M 472, M 474, and M 476. The two sets communicate via switching fabric 440.

As a non-limiting example, a given processing core communicates with other processing cores via message passing or other techniques. Although FIG. 4 shows a certain number of components of computing resource 400 arranged in a certain manner, in different embodiments, there are more or fewer components and/or differently-arranged components. Processing cores are implemented using FPGAs, CPUs, GPUs, or other processing arrangements such as those described herein.

In embodiments, an image file is used to configure or re-configure FPGAs when implemented. The image file or similar file or program may be delivered via a network link or a local link (e.g., peripheral component interconnect express (PCIe)) from a host CPU. Information included in an image file is used to program the logic blocks and reconfigurable interconnects of an FPGA to implement desired functionality. Example hardware implementations are configured to perform desired functionality to support any service that can be offered via a combination of computing, networking, and/or storage resources such as, but not limited to, via a data center or other infrastructure for delivering/providing a service.

Trained models are deployed in cloud computing environments, according to embodiments. Cloud computing as used herein refers to a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources are enabled to be rapidly provisioned via virtualization and released with low management effort or service provider interaction, and then scaled accordingly. Some cloud computing models are composed of various characteristics such as, by way of non-limiting examples, on-demand self-service, broad network access, resource pooling, rapid elasticity, measured service, and/or the like, and some cloud computing models are used to expose various service models, such as but without limitation, Hardware as a Service ("HaaS"), Software as a Service ("SaaS"), Platform as a Service ("PaaS"), and Infrastructure as a Service ("IaaS"). Cloud computing models are also configured to be deployed using different deployment models such as private cloud, community cloud, public cloud, hybrid cloud, and so forth, in various embodiments provided herein.

Systems and devices, which include one or more distributed or "cloud-based" implementations, in embodiments, are configured to be associated with, or a part of, a cloud-based service platform such as Microsoft® Azure®, e.g., Microsoft® Azure® Machine Learning from Microsoft Corporation of Redmond, Wash., and in some embodiments, these systems and devices comprise an on-premises server (s) in addition to, or in lieu of, cloud-based servers. The various systems/devices herein are configured to perform machine learning and/or model training functions/operations using gradient accumulation with free momentum. It should be noted that as described herein, embodiments are applicable to any type of system for machine learning and/or model training using gradient accumulation with free momentum. As noted above, one example of implementations noted above are network, or "cloud," implementations, applications, or services in a network architecture/platform. A cloud platform includes a networked set of computing resources, including servers, routers, etc., that are configurable, shareable, provide data security, and are accessible over a network such as the Internet, according to embodiments. Cloud applications/services are configured to run on these computing resources, often atop operating systems that run on the resources, for entities that access the applications/services, locally and/or over the network. A cloud platform is configured to support multi-tenancy, where cloud platform-based software services multiple tenants, with each tenant including one or more users who share common access to software services of the cloud platform. Furthermore, a cloud platform is configured to support hypervisors implemented as hardware, software, and/or firmware that run virtual machines (emulated computer systems, including operating systems) for tenants. A hypervisor presents a virtual operating platform for tenants.

In addition to the BERT model exemplarily described herein, machine learning services such as those based on Recurrent Neural Networks (RNNs), Convolution Neural Networks (CNNs), Long Short Term Memory (LSTM) neural networks, or Gated Recurrent Units (GRUs) are also contemplated for implementing using the examples described in this disclosure. In one example, the service-related content or other information, such as words, sentences, images, videos, or other such content/information, are translated into a vector representation. The vector representation correspond to techniques such as RNN, CNN, LSTM, or GRU, in embodiments. In another example, the neural network model comprises many layers and each layer is encoded as one or more matrices or vectors of weights expressed in the form of coefficients or constants that have been obtained via off-line training of a neural network.

Programmable hardware logic blocks in the nodes are configured to process the matrices or vectors to perform various operations, including multiply, add, and other operations against input vectors representing encoded information related to the service. In one example, the matrices or vectors of weights may be partitioned and pinned across multiple nodes using techniques such as graph partitioning. As part of this process, a large neural network is translated into an intermediate representation (e.g., a graph) and then the intermediate representation may be carved into smaller representations (e.g., sub-graphs) and each of the matrices of weights corresponding to each sub-graph are pinned to on-chip memory(ies) of the nodes. In another example, the models are translated into fixed-size matrices and vectors. In this way, one or more processing device's resources are configured to operate on the fixed-size matrices and vectors in parallel.

For instance, referring to an LSTM example, an LSTM network comprises a sequence of repeating RNN layers or other types of layers. Each layer of the LSTM network consumes an input at a given time step, e.g., a layer's state from a previous time step, and produces a new or updated set of outputs or states. In the case of using the LSTM, a single chunk of content may be encoded into a single vector or multiple vectors. As an example, a word or a combination of words (e.g., a phrase, a sentence, a paragraph, etc.) is encoded as a single vector, and each chunk is encoded into an individual layer (e.g., a particular time step) of an LSTM network. An example LSTM layer is described using a set of equations, which are implemented in hardware processing devices in embodiments, such as the ones below:

$$i_t = \sigma(W_{xi}x_t + W_{hi}h_{t-1} + W_{ci}c_{t-1} + b_i) \quad \text{(Eq. 1)}$$

$$f_t = \sigma(W_{xf}x_t + W_{hf}h_{t-1} + W_{cf}c_{t-1} + b_f) \quad \text{(Eq. 2)}$$

$$c_t = f_t c_{t-1} i_t \tan h(W_{xc}x_t + W_{hc}h_{t-1} + b_c) \quad \text{(Eq. 3)}$$

$$o_t = \sigma(W_{xo}x_t + W_{ho}h_{t-1} + W_{co}c_t + b_o) \quad \text{(Eq. 4)}$$

$$h_t = o_t \tan h(c_t) \quad \text{(Eq. 5)}$$

In this example, inside each LSTM layer, the inputs and hidden states are processed using a combination of vector operations (e.g., dot-product, inner product, or vector addition) and non-linear functions (e.g., sigmoids, hyperbolic, and tangents). In certain cases, the most compute intensive operations may arise from the dot products, which are be implemented using dense matrix-vector and matrix-matrix multiplication routines. In one example, the processing of the vector operations and non-linear functions may be performed in parallel.

Figure 5:
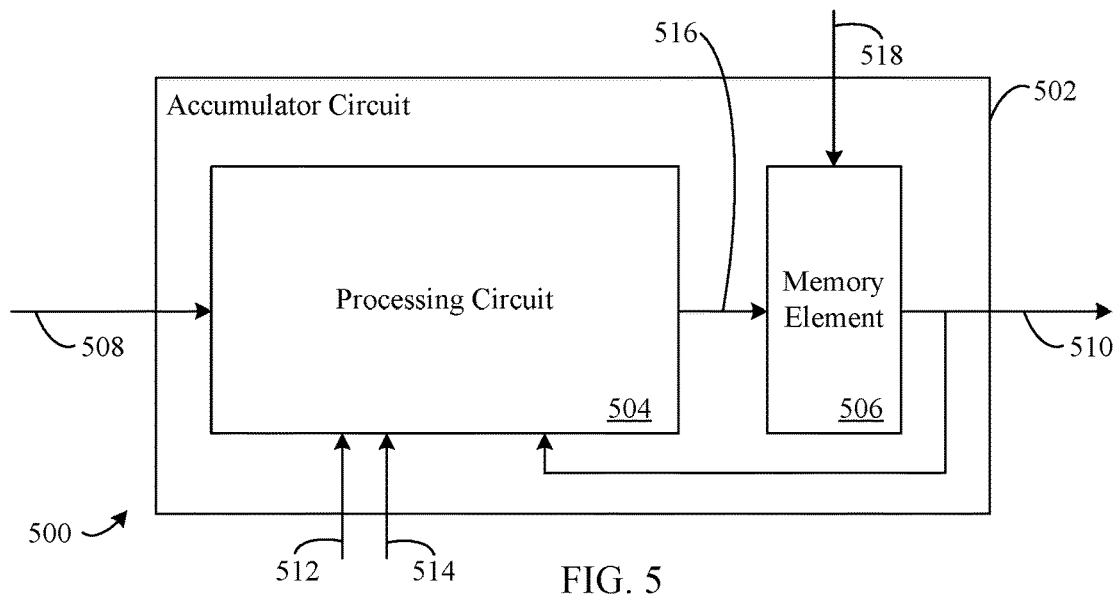
FIG. 5 shows a block diagram of an accumulator for gradient accumulation with free momentum.

FIG. 5 shows a block diagram of an accumulator 500 that illustrates accumulation of gradients with free momentum for training a neural network model, in accordance with embodiments. Accumulator 500 is configured to be an embodiment of system 100 of FIG. 1, transformer 200 of FIG. 2, system 300 of FIG. 3, and/or computing resource 400 of FIG. 4, where accumulator 500 is a hardware processing device/circuit, such as but not limited to those noted in this description, that is implemented therein. Accumulator 500 is described as follows.

As shown in FIG. 5, accumulator 500 includes an accumulator circuit 502 that is configured as a hardware-based circuit in embodiments. Accumulator circuit 502 receives an input 508 that corresponds to a currently computed difference weight, or gradient, for a pass of a neural network model training process. In embodiments, input 508 is referred to as a difference weight or a delta weight, which is utilized to weight different values for a pass of a model training processes depending on where in, or which portion of, the neural network accumulator 500 is implemented. Input 508 is provided to a processing circuit 504 of accumulator circuit 502. In embodiments, processing circuit 504 includes one or more hardware circuit portions such as multipliers, adders/filters, and/or the like, configured to process input 508.

Processing circuit 504 is also configured to accept one or more weighting parameters, or weights, such as a first weighting parameter 512 and a second weighting parameter 514. First weighting parameter 512 and second weighting parameter 514 modify the amount of, or a portion of, a prior pass weight such as is shown for an output 510, into the current weight update for input 508 during training, which is added to the prior pass weight as the new value of output 510. This allows for an acceleration of training convergence by (1) increasing updates associated with gradients that speed up convergence, and (2) decreasing updates associated with gradients that increase oscillation or diverge, i.e., momentum. With respect to accumulator circuit 502 of FIG. 5, first weighting parameter 512 modifies input 508, and second weighting parameter 514 modifies output 510, such that the value of input 508 and the value of output 510 are relatively weighted during processing performed by processing circuit 504 to utilize gradients that bring about a faster convergence instead of gradients that cause divergence. Accordingly, in embodiments, the values of first weighting parameter 512 and second weighting parameter 514 are related or correlated.

Accumulator circuit 502 also includes a memory element 506. In embodiments, memory element 506 is an element, or a portion of, a hardware-based memory such as are described with respect to system 400 of FIG. 4 and/or elsewhere herein. Additionally, in embodiments, memory element 506 is utilized, without additional memory elements, for accumulation of gradients with free momentum. For instance, the value of input 508, as weighted by weighting parameter 512, is added to, or filtered with, the value of output 510, as weighted by weighting parameter 514, via processing circuit 504. The result of the adding/filtering is provided as a memory input 516, i.e., a gradient update, to memory element 506 which stores the updated, accumulated gradient.

It should be noted that while accumulator 500 is exemplarily shown as having two weighting parameters, e.g., first weighting parameter 512 and second weighting parameter 514, for illustrative clarity and ease of description, different numbers of weighting parameters are contemplated for various embodiments herein.

Accumulator 500 of FIG. 5 also includes a latched reset 518 for memory element 506. Latched reset 518, when asserted, is configured to cause memory element 518 to provide its currently-stored weight, with accumulated gradient values, as the value of output 510. In this way, the value of the prior training pass for output 510, which is utilized for free momentum during the operation of processing circuit 504, is updated for the next training pass of the neural network model.

Latched reset 518 may be asserted at different times, e.g., at a time 'k' described in further detail below, to vary the gradient updates used to train the models during the determination of the next weight to be used in the next training pass. In other words, the configuration of accumulator circuit 502 enables gradient accumulation with free momentum that does not require an additional instance of memory element 506 to account for the momentum—in this manner, the momentum is achieved for free.

As noted herein, a prior techniques for updating weights in neural networks is batched SGD, which involves running multiple samples through a network before updating the weights. Various ways for dealing with larger batch size exist, but each of them require a large amount of memory, as well as additional memory for momentum. Embodiments herein reduce these memory needs via gradient accumulation, where as part of the gradient accumulation, e.g., after each backward pass, the computed gradient (e.g., the value of input 508) may be added to the previously accumulated gradient (e.g., the value of output 510), according to the hardware-based examples provided. However, unlike existing solutions that use batched SGD or block averages based on a simple summation of gradients, embodiments herein are configured to perform processing with similar characteristics to a moving average for gradient accumulation with free momentum, for instance, by approximating the behavior of a leaky accumulator with continuous gradient accumulation.

As an example, the following equations are used to illustrate this behavior with free momentum, for some embodiments:

$$v_n = v_{n-1} + \beta v_{n-1} + \alpha \nabla w_{n-1} \quad \text{(Eq. 6)}$$

$$w_n = w_{n-k} + v_n \quad \text{(Eq. 7)}$$

where the next pass weight $w_n$ to be provided as the value of output 510 is the sum of the weight $w_{n-k}$ currently stored by memory element 506 and the current gradient vector $v_n$, and $v_n$ is the sum of the prior vector $v_{n-1}$, the product of $\beta$ applied to $v_{n-1}$, and the product of $\alpha$ applied to the gradient of the prior weight $w_{n-1}$.

Figure 6A:
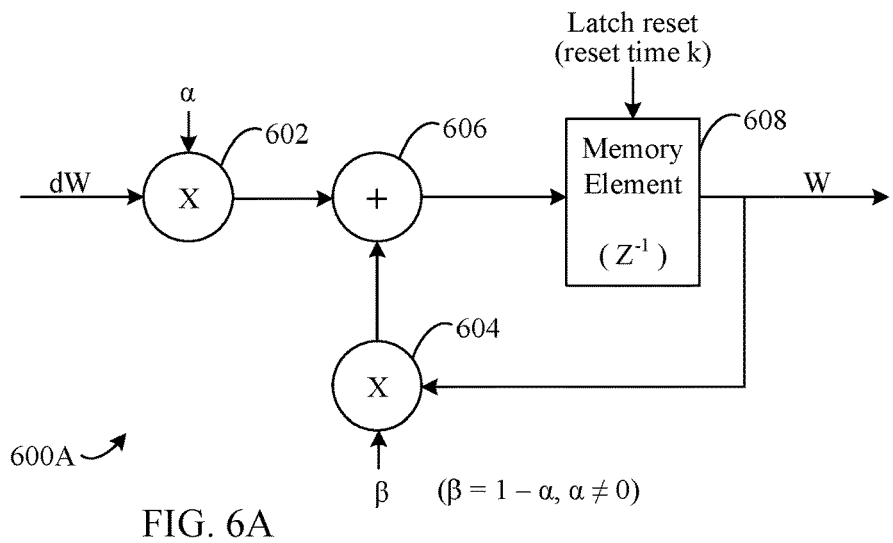
FIG. 6A shows a functional block diagram of an accumulator for gradient accumulation with free momentum, in accordance with an example embodiment.
Figure 6B:
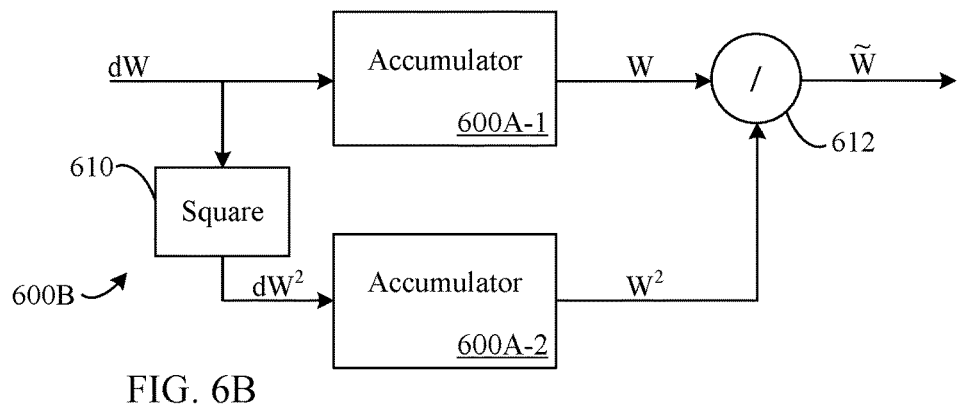
FIG. 6B shows a functional block diagram of an accumulator system for power-normalized gradient accumulation with free momentum, in accordance with an example embodiment.
Figure 7:
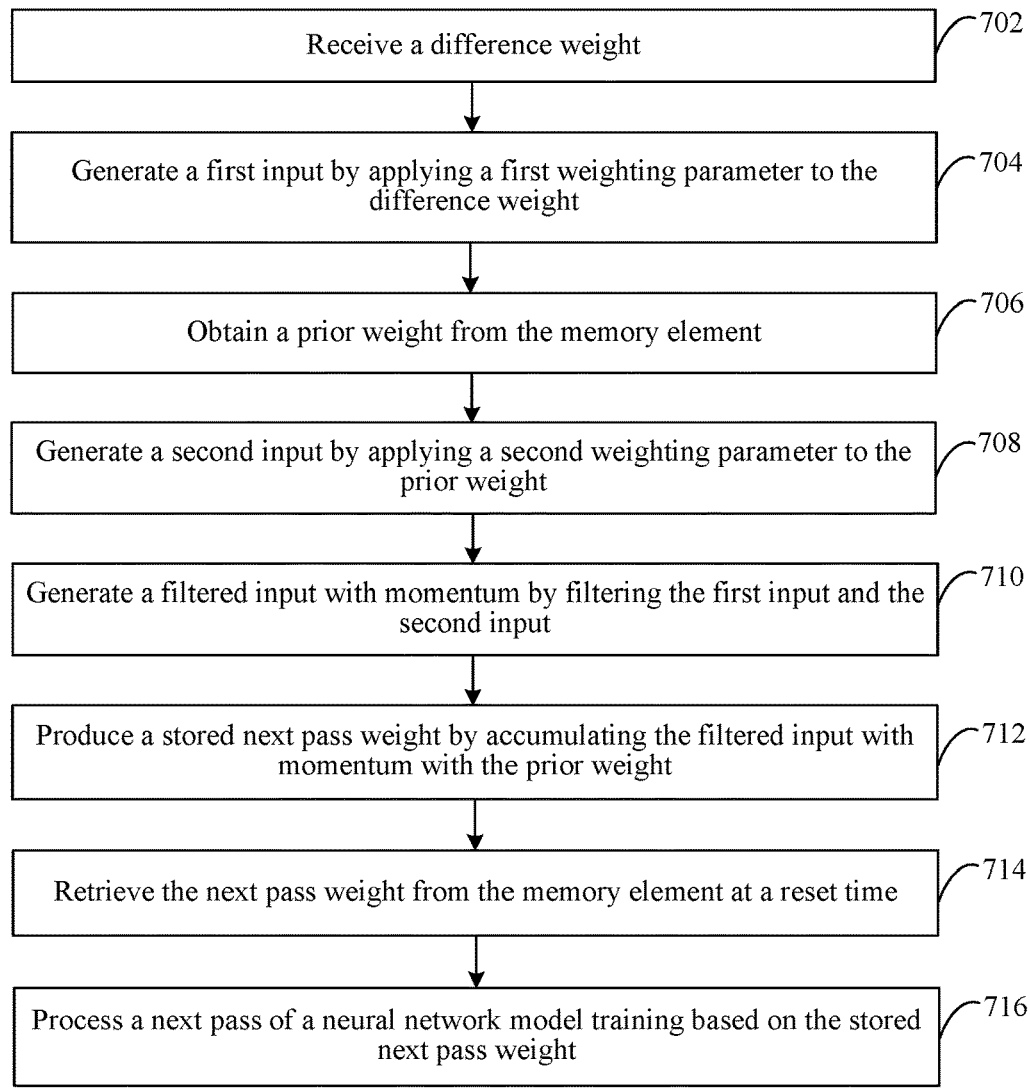
FIG. 7 shows a flowchart for gradient accumulation with free momentum, in accordance with an example embodiment.

FIGS. 6A and 6B, and FIG. 7, will now be described. In FIG. 6A, a block diagram of an accumulator 600A that illustrates accumulation of gradients with free momentum for training a neural network model is shown, in accordance with embodiments. Accumulator 600A is configured to be an embodiment of accumulator 500 of FIG. 5. Accumulator 600A is described below in view of Equation 6 and Equation 7 described above. FIG. 6B shows a functional block diagram of an accumulator system 600B ("system 600B," hereinafter) for power-normalized gradient accumulation with free momentum for training a neural network model, in accordance with embodiments. In FIG. 6B, system 600B includes two instances of accumulator 600A, an accumulator 600A-1 and an accumulator 600A-2, configured to implement second order momentum. Accumulator 600B is configured to be a further embodiment of accumulator 600A of FIG. 6A. In embodiments, system 600B represents momentum via Adam, noted above, utilizing a second order power normalization, e.g., a square of the delta weight input that is normalized by power. In such embodiments, the magnitude of the input signal (e.g., similar to a root mean square (RMS)), is used to represent the power of the input where first order accumulator 600A-1 provides for a running average or mean, and second order accumulator 600A-2 provides for variance, e.g., as applied in an Adam implementation.

FIG. 7 shows a flowchart 700 for gradient accumulation with free momentum, according to an example embodiment. Flowchart 700 is performed by the systems, devices, and circuits described herein, according to embodiments. Further structural and operational examples will be apparent to persons skilled in the relevant art(s) based on the following description. Flowchart 700 begins at step 702 and is described as follows with respect to accumulator 600A of FIG. 6A, as well as Equation 6 and Equation 7 described above.

As shown in FIG. 6A, accumulator 600A includes a first multiplier 602, a second multiplier 604, and an adder 606 (also referred to as a filter, in embodiments), which comprise at least a portion of processing circuit 504 of accumulator 500, according to embodiments. For example, first multiplier 602, second multiplier 604, and adder 606 are configured as a hardware-based circuit in embodiments.

First multiplier 602 receives a first weighting parameter (alpha ($\alpha$), e.g., as corresponding to first weighting parameter 512 of accumulator 500) and an input difference weight or delta weight (dW) that corresponds to input 508, e.g., a currently computed difference weight, or gradient of a prior weight, for a pass of a neural network model training process. First multiplier 602 computes the product of its inputs, i.e., applies the first weighting parameter $\alpha$ to dW and provides its output to adder 606.

As shown for system 600B in FIG. 6B, each instance of accumulator 600A (accumulator 600A-1 and accumulator 600A-2) is configured as described for accumulator 600A above, in embodiments, each accumulator receiving the first weighting parameter $\alpha$ to be applied, e.g., multiplied, to their respective inputs corresponding to the input difference weight dW to perform second order gradient accumulation with free momentum. Accumulator 600A-1 (the first order accumulator) receives dW as described for FIG. 6A, while accumulator 600A-2 (the second order accumulator) receives as its respective input the square of dW (i.e., $dW^2$) representing the power of the input signal dW. The value of $dW^2$ is generated by square function generator 610, as shown in FIG. 6B.

Referring now to FIG. 7 and flowchart 700, in step 702, a first difference weight is received. For example, first multiplier 602 of accumulator 600A in FIG. 6A receives input dW calculated as an initial gradient for weight W during neural network model processing. As shown in FIG. 6B, accumulator 600A-1 also receives dW, while accumulator 600A-2 receives $dW^2$ via square function generator 610.

In step 704, a first input is generated by applying a first weighting parameter to the difference weight. For instance, in FIG. 6A, first multiplier 602 also receives the first weighting parameter $\alpha$ which is used by first multiplier 602 to generate a product with dW received in step 702. This product output of first multiplier 602 is the first input to adder 606 of accumulator 600A, as shown in FIG. 6A. In FIG. 6B, accumulator 600A-1 also generates its first input by applying the first weighting parameter to the difference weight, and accumulator 600A-2 generates its first input by applying the first weighting parameter to the square of the difference weight ($dW^2$).

Second multiplier 604 of accumulator 600A in FIG. 6A receives a second weighting parameter (beta ($\beta$), e.g., as corresponding to second weighting parameter 514 of accumulator 500) and an output weight, or prior weight (W)

before the latched reset is asserted, that corresponds to output 510. Second multiplier 604 computes the product of its inputs, i.e., applies the second weighting parameter β to W and provides its output to adder 606. In FIG. 6B, accumulator 600A-1 also receives the second weighting parameter β and output weight W at its second multiplier, as described above for FIG. 6, and accumulator 600A-2 similarly receives the second weighting parameter β and a squared output weight $W^2$ at its second multiplier. The product of these multiplication operations are the respective second inputs of accumulator 600A-1 and accumulator 600A-2 to their respective adders.

Referring again to FIG. 7 and flowchart 700, in step 706, a prior weight is obtained from a memory element. For example, memory element 608 of accumulator 600A in FIG. 6A has as its output W which is the prior weight of the prior pass of the neural network model training. With respect to FIG. 6B, accumulator 600A-1 also has a prior weight W, and accumulator 600A-2 has a prior weight of $W^2$, each of which are stored in respective memory elements of these accumulators.

In step 708, a second input is generated by applying a second weighting parameter to the prior weight. For instance, second multiplier 604 also receives the second weighting parameter β which is used by second multiplier 604 to generate a product with W received in step 706. This product output of second multiplier 604 is the second input to adder 606 of accumulator 600A, as shown in FIG. 6A, and accumulator 600A-1 of FIG. 6B is configured to operate similarly. Accumulator 600A-2 of FIG. 6B applies the second weighting parameter β to the prior weight $W^2$ as its second input for the adder of accumulator 600A-2.

In the illustrated embodiments of accumulator 600A in FIG. 6A and system 600B in FIG. 6B, the weighting parameters shown are related, or correlated, where $β=1-α$, and $α≠0$, although other relations/correlations are also contemplated herein.

In step 710 of flowchart 700, a filtered input with momentum is generated by filtering the first input and the second input. For example, referring back to FIG. 6A, adder 606 of accumulator 600A is configured to add, or filter, the products of first multiplier 602 and second multiplier 604. Because the first and second weighting parameters are applied as part of the inputs to adder 606, gradients favorable to convergence, i.e., accelerating convergence, are given a greater impact for updating the weight used for the next pass of the neural network model training. Accumulator 600A-1 and accumulator 600A-2 of FIG. 6B are configured to operate similarly with their respective first and second adder inputs, for first- and second-order operations.

In step 712, a stored next pass weight is produced by accumulating the filtered input with momentum with the prior weight. For instance, the sum or filtered result of adder 606 of accumulator 600A in FIG. 6A is provided as an input to a memory element 608 of accumulator 600A. Memory element 608, shown as an embodiment of memory element 506 of accumulator 500 in FIG. 5, is configured to incrementally add, or accumulate, the output sum/filtered result of adder 606 to the current value of the weight stored in memory element 608. This accelerates training convergence of neural network models via free momentum by increasing updates associated with gradients that speed up convergence as well as decreasing updates associated with gradients that increase oscillation or diverge during the determination of the weight for the next pass of the processing. Accumulator 600A-1 of FIG. 6B is configured to operate similarly as accumulator 600A in FIG. 6A, as is accumulator 600A-1 of FIG. 6B where the stored next pass weight represents the power, i.e., $W^2$.

As noted herein, according to embodiments, memory element 608 is thus utilized, without any additional memory elements, for accumulation of gradients with free momentum.

With reference to flowchart 700, in step 714, the next pass weight is retrieved from the memory element at a reset time. For example, accumulator 600A of FIG. 6A includes a latched reset input for memory element 608. This latched reset, as shown, is similarly configured as latched reset 518 in FIG. 5, and when asserted, is configured to cause memory element 608 to provide its currently-stored weight, having the accumulated gradient values as a part thereof, as the value of output 510, shown as W in FIG. 6A. Accordingly, the value of the prior training pass for W, which is utilized for free momentum during the operation of accumulator 600A, is updated as a new output value W for the next training pass of the neural network model. The latched reset for memory element 608 is configured to be asserted at different times, e.g., at a reset time 'k' described with respect to Equation 7 above, to vary the gradient updates used to train the models during the determination of the next weight to be used in the next training pass.

For instance, the vector $v_n$ of Equations 6 and 7 has variable properties which enable the approximation of a block accumulation with an equivalent averaging length of $1/α$, and where free momentum is gained. That is, the block length is adjustable to tune the gradient accumulation via latched resets at time k, while still achieving the benefits of free momentum: improved processes for faster convergence and no increase in memory footprint for momentum. As non-limiting examples, when k=1 this is equivalent to a batch size of 1 with momentum, when $k=1/α$ this is approximately equivalent to batched SGD with batch size k and momentum, and when k has a value between 1 and $1/α$ an approximation of filtered batch size with momentum is provided.

Referring to FIG. 6B, the outputs of memory elements of accumulator 600A-1 and accumulator 600A-2 are provided at reset time k to a divider 612. Divider 612 is configured to divide the next pass weight of accumulator 600A-2 (i.e., the power, $W^2$) by the next pass weight of accumulator 600A-2 (i.e., W) to generate a normalized next pass weight (W), i.e., a next pass weight that is normalized according to the power of the signal input to the accumulators dW.

In step 716 of flowchart 700, a next pass of a neural network model training is processed based on the stored next pass weight. For example, after the gradient accumulation with free momentum described above is performed, e.g., between passes of a neural network model training, a next weight for the next pass of the training is finally determined and stored in memory element 608 for FIG. 6A. Stored weights are retrieved/output by memory element 608 at reset time k, and are thus available for provision to a processing system performing the passes for the neural network model training. As noted above for FIG. 6B, the power-normalized next pass weight W is provided from the memory elements of accumulator 600A-1 and accumulator 600A-2 via divider 612 to be used in the next pass of the neural network model training.

Thus, the configuration of accumulator 600A in FIG. 6A and/or system 600B in FIG. 6B, as exemplarily described with respect to flowchart 700 of FIG. 7, enable gradient accumulation with free momentum that does not require an additional instance of memory element 506 in a given accumulator to account for the momentum and also enables an accumulator with tunable characteristics for implementations at different points in a neural network model for training.

As noted above, instances of accumulators, e.g., accumulator 500 of FIG. 5, accumulator 600A of FIG. 6A, and/or accumulators 600A-1/600A-2 of system 600B in FIG. 6B, that are configured for gradient accumulation with free momentum, are included at one or more points of a system processing/training neural network models, e.g., in layers, transformers, etc., according to embodiments. In this way, processing systems are configured for flexibility and scalability with respect to bandwidth and convergence rates for training neural network models.

Figure 8:
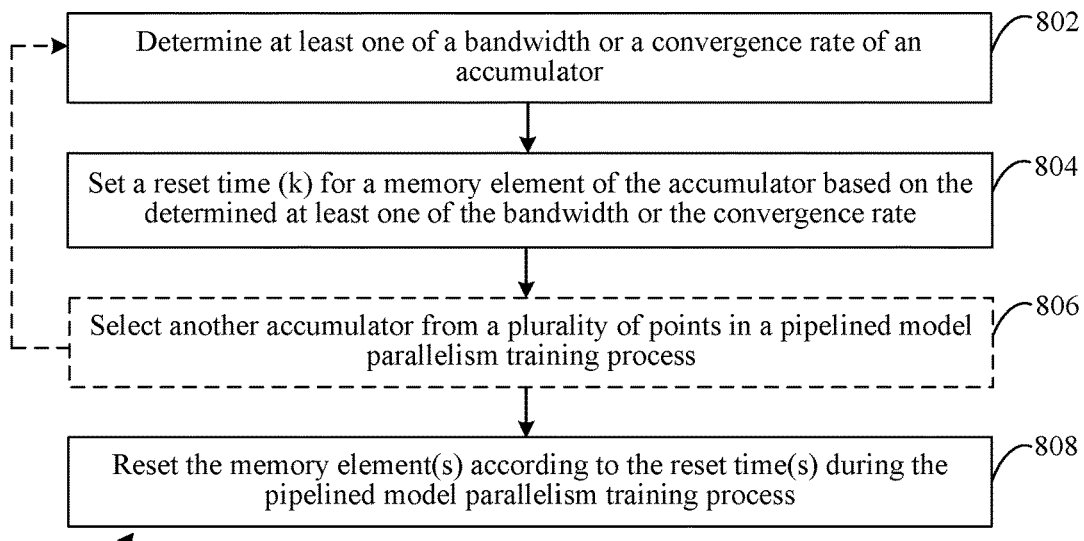
FIG. 8 shows a flowchart for gradient accumulation with free momentum, in accordance with an example embodiment.

Referring now to FIG. 8, a flowchart 800 for gradient accumulation with free momentum is shown, according to an example embodiment. Flowchart 800 is performed by the systems, devices, and circuits described herein, according to embodiments. Further structural and operational examples will be apparent to persons skilled in the relevant art(s) based on the following description. Flowchart 800 begins at step 802 and is described as follows with respect to accumulator 600A of FIG. 6A, although it should be noted that application of flowchart 800 is applicable to accumulators 600A-1/600A-2 of system 600B in FIG. 6B.

In step 802, at least one of a bandwidth or a convergence rate of an accumulator is determined. For example, system resource availability, cost, etc., may require a reduced bandwidth for model training and/or an accelerated convergence with less time/resources used for training. In such cases, a processing system that trains neural network models is configured to have operational parameters determined for bandwidth and/or convergence rate of training for models set accordingly.

In some embodiments, these operational parameters may be dynamically determined and/or set based on training performance, changes in resource allocation/availability, and/or the like. The determined parameters for bandwidth and/or convergence rate correlate with the setting and/or tuning of weighting parameters, reset times k, and/or the like, as described herein. Bandwidth and/or convergence rate parameters for accumulators are balanced against factors for model training accuracy, in embodiments.

In step 804, a reset time (k) is set for a memory element of the accumulator based on the determined at least one of the bandwidth or the convergence rate. For instance, the processing system training the neural network model is configured to assign a reset time k for an accumulator therein. As noted above, the reset time k for an accumulator may be varied to provide flexibility in processing. As an example, a shorter reset time k provides for less latency between processing loops and thus faster convergence. Similarly, processing fewer inputs with a shorter reset time k provides for a lower bandwidth for the system to accommodate.

In step 806, another accumulator is selected from a plurality of points in a pipelined model parallelism training process. For instance, any other, or several other, accumulators in the processing system are selectable/selected in embodiments for respective, or shared, determinations for bandwidth and/or convergence rate of training for models. In such cases, step 802 and step 804 are performed for these other accumulators in the processing system subsequent to their selection in step 806.

Step 806 is optional in embodiments, and may selectively be performed zero or more times based on computing system, model, and/or training requirements.

In step 808, the memory element(s) are reset according to the reset time(s) during the pipelined model parallelism training process. For example, during a pipelined model parallelism training process, latched resets at reset time(s) k are asserted such that memory elements of accumulators described herein output their stored values, having accumulated gradients as portions thereof, for further processing/training.

Accordingly, the embodiments described above are configured to operate in various ways to enable gradient accumulation with free momentum.

The examples above in this Section are illustrative in nature only, and are not to be considered limiting. It is contemplated that variations and equivalent implementations are encompassed by the embodiments as would be understood by persons of skill in the relevant art(s) having the benefit of this disclosure.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including system 100 of FIG. 1, transformer 200 of FIG. 2, system 300 of FIG. 3, computing resource 400 of FIG. 4, accumulator 500 of FIG. 5, accumulator 600A of FIG. 6A, and/or system 600B of FIG. 6B, along with any components and/or sub-components thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 9:
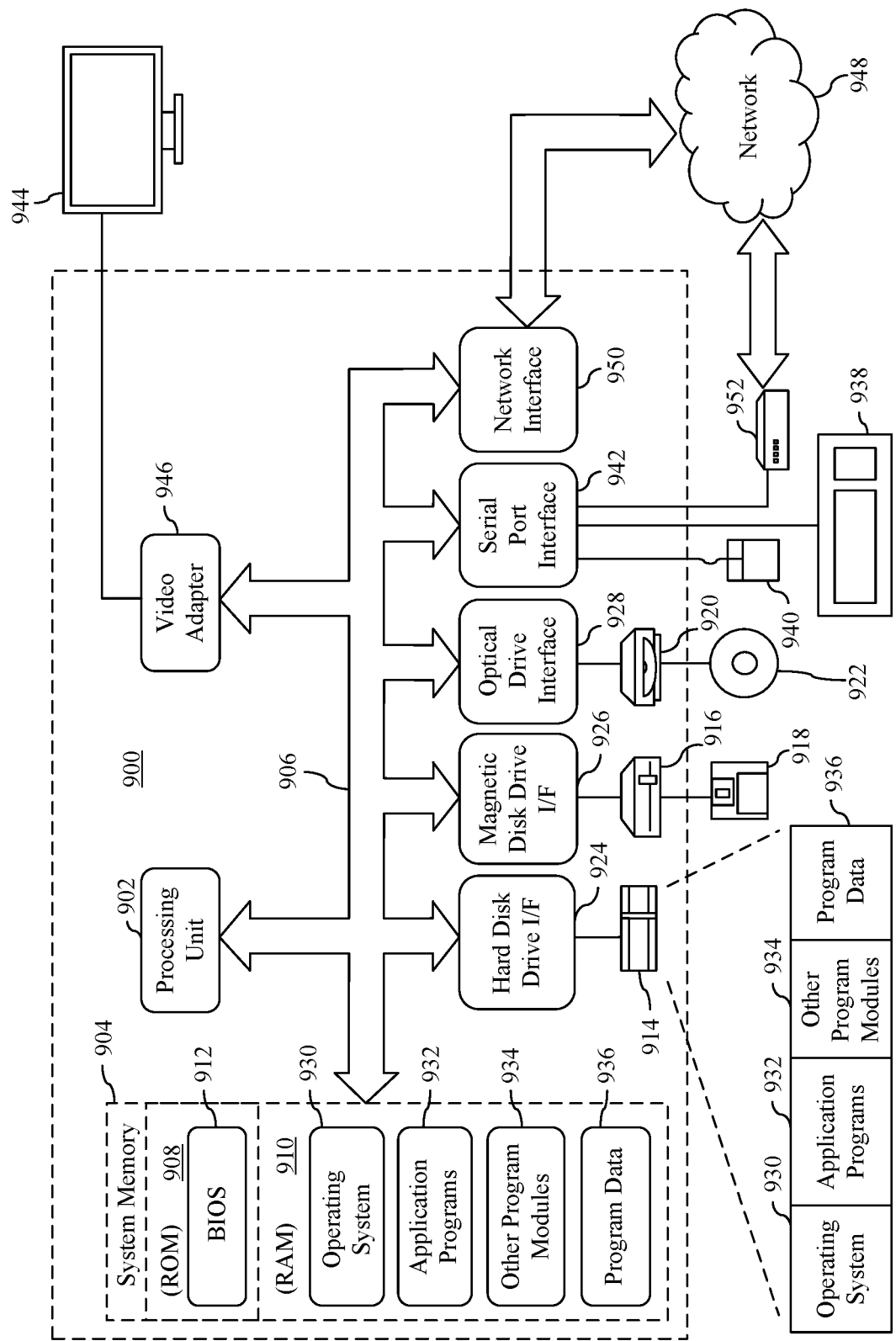
FIG. 9 shows a block diagram of an example computing device used to implement embodiments.

FIG. 9 depicts an exemplary implementation of a computing device 900 in which embodiments may be implemented. For example, embodiments described herein may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems and/or game consoles, etc., as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit described in this Section and/or elsewhere herein. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing embodiments described herein, such as system 100 of FIG. 1, transformer 200 of FIG. 2, system 300 of FIG. 3, computing resource 400 of FIG. 4, accumulator 500 of FIG. 5, accumulator 600A of FIG. 6A, and/or system 600B of FIG. 6B, along with any components and/or subcomponents thereof, as well as the flowcharts/flow diagrams described herein, including portions thereof, and/or further examples described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

Some embodiments herein including pipelined model parallelism are described with reference to an example of the Bidirectional Encoder Representations from Transformers (BERT) model for illustration, and by way of non-limiting example only, although other types of models/architectures are also contemplated. In some embodiments, the BERT model is illustrated and described for word completions for sentences and other natural language processing (NLP) related problems and/or training. The embodiments herein are configured to provide gradient accumulation with free momentum that leads to faster convergence times of models such as BERT. In other words, the processing for neural network model training is improved in computing systems.

Conventional solutions also lack the ability to increase processing efficiency and provide tuning for convergence rates and bandwidth considerations without requiring additional memory resources. The neural network model training improvements described herein for gradient accumulation with free momentum provide further increases in processing efficiency, scalability, and tuning, without increasing the system memory footprint for the processing through the accumulator configuration that provides weighted feedback for prior pass weights at specified times via latched resets of memory elements during the processing of the next pass weight.

While embodiments described in the Sections above are described in the context of examples for illustrative clarity and ease of description, the embodiments herein are not so limited and are also applicable to different types of devices, for different types of models, different types of momentum, various numbers of layers, and/or the like. For example, the described embodiments support Nesterov methods for accelerated gradients without a memory penalty, and are able to be scaled to any other form of momentum or filter like Adam with power normalization while still providing free momentum without a memory penalty.

Furthermore, the described embodiments are able to be implemented in software-based contexts, and do not exist in software implementations for gradient accumulation with free momentum. Moreover, the embodiments herein allow for finer control over the convergence of the model training via the ability to tune both learning rate and bandwidth at individual accumulators throughout the computing system. The approximated running average of accumulators is reset at a specified time k, as related to convergence and/or bandwidth. Alternatively, in embodiments, the accumulator's value may be reset after a certain specified number of backward passes.

The use of gradient accumulation with free momentum described herein also allows the computing resources (e.g., the various processors described herein) to persist the changes to the weights on-chip, and after an update of the weights for a next model training pass, the on-chip accumulated gradients may be flushed, and the accumulation process may restart. In addition, the accumulated gradients may be used to update parameters other than the weights. Such parameters include, without limitation, any adaptive parameters associated with a neural network model, including biases, normalization parameters and/or the like.

The additional examples and embodiments described in this Section may be applicable to examples disclosed in any other Section or subsection of this disclosure.

A system is described herein. The system may be configured and enabled in various ways for training a neural network model using momentum-based gradient accumulation, including free momentum, as described herein. The system includes a computing resource, and an accumulator that itself includes a processor circuit and a memory element connected thereto. The processor circuit is configured to receive a difference weight and generate a first input by applying a first weighting parameter to the difference weight, and obtain a prior weight from the memory element and generate a second input by applying a second weighting parameter to the prior weight. The processing circuit is also configured to generate a filtered input with momentum by filtering the first input and the second input. The memory element is configured to produce a stored next pass weight by accumulating the filtered input with momentum with the prior weight, and the computing resource is configured to process a next pass of a neural network model training based on the stored next pass weight.

In an embodiment of the system, the first weighting parameter has a value greater than zero and less than or equal to one, and the second weighting parameter has a value of one minus the first weighting parameter.

In an embodiment of the system, the memory element is a single memory element, and the processor circuit is configured to provide gradient accumulation with momentum utilizing the single memory element.

In an embodiment of the system, the memory element includes a latched reset that is configured to reset the memory element at a reset time that is defined in accordance with at least one of a bandwidth or a convergence rate of the accumulator, and to output the next pass weight when the latched reset is asserted.

In an embodiment, the system further includes a plurality of instances of the accumulator in layers of a neural network.

In an embodiment of the system, the neural network model training is a pipelined model parallelism training process, and the plurality of instances are configured to vary the at least one of the bandwidth or the convergence rate at a plurality of points in the pipelined model parallelism training process.

In an embodiment, the system further includes two instances of the accumulator configured to provide a second-order, power-normalized next pass weight based on variance of difference weight, and the computing resource configured to process the next pass of the neural network model training using the second-order, power-normalized next pass weight.

A method of training a neural network model using momentum-based gradient accumulation is also described herein. The method may be for gradient accumulation with free momentum, as described herein. The method includes receiving, by the processing circuit, a difference weight, generating, by the processing circuit, a first input by applying a first weighting parameter to the difference weight, obtaining, by the processing circuit, a prior weight from a memory element, generating, by the processing circuit, a second input by applying a second weighting parameter to the prior weight, generating, by the processing circuit, a filtered input with momentum by filtering the first input and the second input, and producing a stored next pass weight by accumulating the filtered input with the prior weight in the memory element. The method further includes processing a next pass of a neural network model training based on the stored next pass weight.

In an embodiment of the method, the first weighting parameter has a value greater than zero and less than or equal to one, and the second weighting parameter has a value of one minus the first weighting parameter.

In an embodiment of the method, the memory element is a single memory element, and the method further includes providing gradient accumulation with momentum utilizing the single memory element and without utilizing another memory element.

In an embodiment, the method further includes resetting the memory element at a reset time, that is defined in accordance with at least one of bandwidth or a convergence rate of the accumulator, via a latched reset of the memory element, and outputting the next pass weight by the memory element when the latched reset is asserted.

In an embodiment of the method, the steps performed by the accumulator are performed across layers of a neural network via a plurality of instances of the accumulator.

In an embodiment, the method further includes varying the at least one of the bandwidth or the convergence rate at a plurality of points during a pipelined model parallelism training process.

In an embodiment, the method further includes performing, by another accumulator comprising another processing circuit and another memory element, receiving, by the other processing circuit, another difference weight that represents the power of the difference weight, generating, by the other processing circuit, another first input by applying another first weighting parameter to the other difference weight, obtaining, by the other processing circuit, another prior weight representing the power from the other memory element, generating, by the other processing circuit, another second input by applying another second weighting parameter to the other prior weight, generating, by the other processing circuit, another filtered input with momentum by filtering the other first input and the other second input, producing another stored next pass weight by accumulating the other filtered input with the other prior weight in the other memory element, and generating a power-normalized next pass weight by dividing the other next pass weight by the next pass weight. In the embodiment, the processing utilizes the power-normalized next pass weight.

An accumulator circuit for momentum-based gradient accumulation is also described. The accumulator circuit is configured to provide gradient accumulation with free momentum, in embodiments. The accumulator includes a processor circuit and a memory element connected to the processor circuit. The processor circuit includes a first multiplier circuit configured to receive a difference weight and generate a first input by applying a first weighting parameter to the difference weight, a second multiplier circuit configured to receive a prior weight that is output by the memory element and generate a second input by applying a second weighting parameter to the prior weight, and a filter configured to generate a filtered input with momentum by filtering the first input and the second input. The memory element is configured to produce a next weight of a next pass of a pipelined model parallelism training process by accumulating the filtered input with the prior weight, and output the next weight when a latched reset is asserted.

In an embodiment of the accumulator circuit, the first weighting parameter has a value greater than zero and less than or equal to one, and the second weighting parameter has a value of one minus the first weighting parameter.

In an embodiment of the accumulator circuit, the memory element is a single memory element, and the accumulator circuit is configured to provide gradient accumulation with momentum utilizing the single memory element.

In an embodiment of the accumulator circuit, the memory element includes the latched reset that is configured to reset the memory element at a reset time that is defined in accordance with at least one of bandwidth or a convergence rate of the accumulator circuit.

In an embodiment of the accumulator circuit, the accumulator circuit is one of a plurality of accumulator circuits in layers of a neural network.

In an embodiment of the accumulator circuit, the plurality of accumulator circuits are configured to vary the at least one of the bandwidth or the convergence rate at a plurality of points in the pipelined model parallelism training process.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system for training a neural network model using momentum-based gradient accumulation, the system comprising:
 a computing resource; and
 an accumulator that includes:
  a processor circuit and a memory element connected thereto, the processor circuit configured to:
   receive a difference weight;
   generate a first input by applying a first weighting parameter to the difference weight;
   obtain a prior weight from the memory element;
   generate a second input by applying a second weighting parameter to the prior weight; and
   generate a filtered input with momentum by filtering the first input and the second input;
  the memory element configured to produce a stored next pass weight by accumulating the filtered input with momentum with the prior weight; and
  the computing resource configured to process a next pass of a neural network model training based on the stored next pass weight.

2. The system of claim 1, wherein the first weighting parameter has a value greater than zero and less than or equal to one, and
 wherein the second weighting parameter has a value of one minus the first weighting parameter.

3. The system of claim 1, wherein the memory element is a single memory element; and
 wherein the processor circuit is configured to provide gradient accumulation with momentum utilizing the single memory element.

4. The system of claim 1, wherein the memory element includes a latched reset that is configured to:
reset the memory element at a reset time that is defined in accordance with at least one of a bandwidth or a convergence rate of the accumulator; and
output the next pass weight when the latched reset is asserted.

5. The system of claim 4, further comprising a plurality of instances of the accumulator in layers of a neural network.

6. The system of claim 5, wherein the neural network model training is a pipelined model parallelism training process, and
wherein the plurality of instances are configured to vary the at least one of the bandwidth or the convergence rate at a plurality of points in the pipelined model parallelism training process.

7. The system of claim 1, further comprising two instances of the accumulator configured to provide a second-order, power-normalized next pass weight based on variance of difference weight;
the computing resource configured to process the next pass of the neural network model training using the second-order, power-normalized next pass weight.

8. A method of training a neural network model using momentum-based gradient accumulation, the method comprising:
performing by an accumulator comprising a processing circuit and a memory element:
receiving, by the processing circuit, a difference weight;
generating, by the processing circuit, a first input by applying a first weighting parameter to the difference weight;
obtaining, by the processing circuit, a prior weight from a memory element;
generating, by the processing circuit, a second input by applying a second weighting parameter to the prior weight;
generating, by the processing circuit, a filtered input with momentum by filtering the first input and the second input; and
producing a stored next pass weight by accumulating the filtered input with the prior weight in the memory element; and
processing a next pass of a neural network model training based on the stored next pass weight.

9. The method of claim 8, wherein the first weighting parameter has a value greater than zero and less than or equal to one, and
wherein the second weighting parameter has a value of one minus the first weighting parameter.

10. The method of claim 8, wherein the memory element is a single memory element, and the method further comprises:
providing gradient accumulation with momentum utilizing the single memory element and without utilizing another memory element.

11. The method of claim 10, further comprising:
resetting the memory element at a reset time that is defined in accordance with at least one of bandwidth or a convergence rate of the accumulator, via a latched reset of the memory element; and
outputting the next pass weight by the memory element when the latched reset is asserted.

12. The method of claim 11, wherein the steps performed by the accumulator are performed across layers of a neural network via a plurality of instances of the accumulator.

13. The method of claim 12, further comprising:
varying the at least one of the bandwidth or the convergence rate at a plurality of points during a pipelined model parallelism training process.

14. The method of claim 8, further comprising:
performing by another accumulator comprising another processing circuit and another memory element:
receiving, by the other processing circuit, another difference weight that represents the power of the difference weight;
generating, by the other processing circuit, another first input by applying another first weighting parameter to the other difference weight;
obtaining, by the other processing circuit, another prior weight representing the power from the other memory element;
generating, by the other processing circuit, another second input by applying another second weighting parameter to the other prior weight; and
generating, by the other processing circuit, another filtered input with momentum by filtering the other first input and the other second input;
producing another stored next pass weight by accumulating the other filtered input with the other prior weight in the other memory element; and
generating a power-normalized next pass weight by dividing the other next pass weight by the next pass weight;
wherein said processing utilizes the power-normalized next pass weight.

15. An accumulator circuit for momentum-based gradient accumulation, the accumulator circuit comprising:
a processor circuit, and
a memory element connected to the processor circuit;
the processor circuit comprising:
a first multiplier circuit configured to:
receive a difference weight; and
generate a first input by applying a first weighting parameter to the difference weight;
a second multiplier circuit configured to:
receive a prior weight that is output by the memory element; and
generate a second input by applying a second weighting parameter to the prior weight; and
a filter configured to:
generate a filtered input with momentum by filtering the first input and the second input;
the memory element configured to:
produce a next weight of a next pass of a pipelined model parallelism training process by accumulating the filtered input with the prior weight; and
output the next weight when a latched reset is asserted.

16. The accumulator circuit of claim 15, wherein the first weighting parameter has a value greater than zero and less than or equal to one, and
wherein the second weighting parameter has a value of one minus the first weighting parameter.

17. The accumulator circuit of claim 15, wherein the memory element is a single memory element; and
wherein the accumulator circuit is configured to provide gradient accumulation with momentum utilizing the single memory element.

18. The accumulator circuit of claim 15, wherein the memory element includes the latched reset that is configured to reset the memory element at a reset time that is defined in accordance with at least one of bandwidth or a convergence rate of the accumulator circuit.

19. The accumulator circuit of claim 18, wherein the accumulator circuit is one of a plurality of accumulator circuits in layers of a neural network.

20. The accumulator circuit of claim 19, wherein the plurality of accumulator circuits are configured to vary the at least one of the bandwidth or the convergence rate at a plurality of points in the pipelined model parallelism training process.

* * * * *